April 17, 1956   D. E. WEISS ET AL   2,742,381
METHOD AND APPARATUS FOR COUNTERCURRENT
CONTACTING OF SOLIDS WITH LIQUIDS
Filed Sept. 10, 1952   2 Sheets-Sheet 1

INVENTORS:
DONALD ERIC WEISS
EVERARD ARTUR SWINTON.
by: *[signature]*
ATTORNEY.

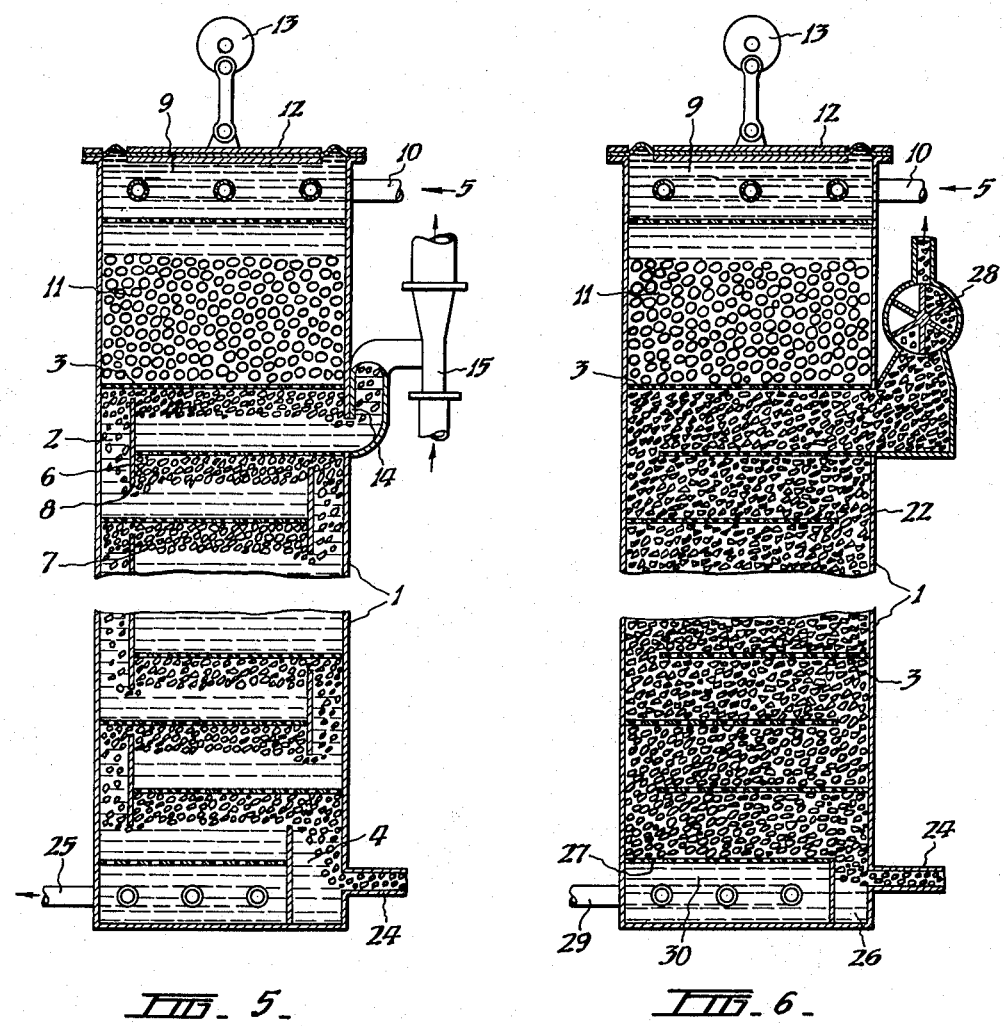

United States Patent Office 2,742,381
Patented Apr. 17, 1956

2,742,381

METHOD AND APPARATUS FOR COUNTERCURRENT CONTACTING OF SOLIDS WITH LIQUIDS

Donald Eric Weiss, Blackburn, Victoria, and Everard Arthur Swinton, Mount Eliza, Victoria, Australia, assignors to Commonwealth Scientific and Industrial Research Organization, East Melbourne, Victoria, Australia, a body corporate Application September 10, 1952, Serial No. 308,842

Claims priority, application Australia December 6, 1951

4 Claims. (Cl. 134—25)

This invention relates to an improved method and apparatus for obtaining continuous countercurrent contact between solid adsorbent particles and a liquid.

Various means have been employed to bring solid adsorbent particles and liquids into effective contact. Frequently a continuous process is desirable but simple and effective means of obtaining countercurrent flow in solid-liquid systems have not been devised.

The simplest method of obtaining countercurrent flow is to allow solid particles to fall freely through a rising column of liquid but the turbulence created by the falling particles creates back-mixing which tends to counteract the countercurrent action, and adequate contact times can only be obtained by the use of excessively long columns. With a view to overcoming these difficulties various moving bed techniques have been devised. One such moving bed countercurrent system employs a vertical tower containing a compact bed of granular solids which are permitted to flow as a compact mass down the column against a rising liquid stream. Although this technique is satisfactory for use in towers of small cross-sectional area, considerable difficulties occur when larger towers are employed, since it is difficult to withdraw the solids uniformly over the whole cross-sectional area of the bottom of the tower, and this results in non-uniform solid movement throughout the tower. If finely divided particles are being treated channeling often occurs with the result that the liquid flow is uneven.

The fluidized solid technique has been proposed for obtaining such countercurrent flow. This technique is based on the fact that when a solid of suitable particle size is added to a liquid stream which is flowing upwards at a velocity less than the free settling rate of the solid a fluidized solid phase is formed. Since this phase is turbulent and can be handled as a liquid the movement of the solids is thus simplified.

Prior to this invention all such fluidized systems have employed continuously rising liquid streams. A number of difficulties are associated with this type of operation particularly if it is used to obtain counter-current contact between an adsorbent and a liquid phase where sufficient contact time must be allowed for adsorption to occur. The contact time is limited by the high liquid flow velocity necessary to maintain fluidized conditions. Thus only very short contact times can be obtained unless recirculating pumps are used to recycle the liquid between each stage. This is undesirable because of the expense involved and is inefficient since considerable liquid short-circuiting between the circulating streams tends to occur. Also, because of the highly turbulent condition in the fluidized solid phase a certain amount of solid short-circuiting occurs whereby some particles spend considerably less than the average time in effective contact with the liquid. This results in inefficiencies. Attrition losses due to particle breakdown are considerable because of the highly turbulent nature of the fluidized particle bed.

Thus, although the fluidized solid technique enables solids to be moved countercurrently to liquids in large scale apparatus, the known methods of procedure do not allow the independent control of solid-liquid contact time that is possible with compact non-turbulent moving bed systems.

An object of this invention is to provide a continuous countercurrent contacting method and apparatus for adsorbent solids and liquids in which any desired liquid-solid contact time can be maintained without having to feed in liquid continuously to maintain the solids in a condition which enables them to flow freely.

Another object is to provide a continuous countercurrent contacting apparatus for adsorbent solids and liquids in which back mixing effects are minimized.

A further object is to provide an intermittently fluidized solid-liquid system in which attrition is minimized.

The method of obtaining continuous countercurrent contact between solid adsorbent particles and liquid according to this invention comprises feeding a particulate adsorbent solid to one end portion of a contacting apparatus and feeding liquid countercurrently to said solid from the opposite end portion of such contacting apparatus, passing said solid along a series of perforated plates arranged at progressively varying levels and pulsating said liquid so that at each pulsation liquid passes through and returns through the perforations in said plates and thus intermittently produces completely or partly fluidized beds of solid particles in contacting compartments adjacent to said plates, adjusting the magnitude of the pulsations to control the mobility of the particles and adjusting the overall liquid flow velocity to give the desired liquid contact time in the contacting apparatus, permitting the particles to flow consecutively from contacting compartment to contacting compartment at a controlled rate, removing the particles from the apparatus after countercurrent contact with the liquid, and removing the liquid which has passed countercurrently to the solids through the contacting apparatus.

Another feature of this invention resides in obtaining continuous countercurrent contact between solid adsorbent particles and liquid by feeding a particulate solid adsorbent, in the case where the particles have a density greater than that of the liquid to be contacted, into a top contacting compartment of a contacting apparatus provided with a series of contacting compartments formed by a train of perforated horizontal or gently sloping plates each having one or more downflow ducts, to connect the adjacent contacting compartments together, which extend upwardly into a contacting compartment to provide a weir which controls the level of the solids in that contacting compartment and which extend down beneath the minimum level of the solids in the next lower contacting compartment and the position of which is remote in relation to the ducts in adjacent plates, passing a feed liquid up through the perforated plates so that it passes up through each contacting compartment in turn, pulsating said feed liquid so that the bed of particles lying on each perforated plate is completely or partly fluidized on the upward pulsation and is completely or partly settled on the downward pulsation and so that the movement of the particles at each pulsation is thereby restricted to a limited extent dependent on the magnitude of the pulsation, adjusting the magnitude of the pulsation to control the mobility of the particles and adjusting the overall liquid flow velocity to give the desired liquid contact time in the contacting apparatus, permitting the particles to flow consecutively from contacting compartment to contacting compartment at a rate equal to the rate at which the particles are fed to the apparatus, this rate being less than the maximum rate at which particles can flow freely over the weir in each contacting compartment, withdrawing the particles by suitable means from one or more contacting compartments, and removing the liquid which has passed up the contacting apparatus countercurrently to the descending solids. The size of the perforations in the plates must be less than the size of the particles, and the percentage of void area in the plates should be as high as possible. The pulsation should be distributed evenly over the cross-section of the contacting apparatus. In the case where the particles have a density less than that of the liquid the procedure is reversed by feeding the particulate solid (most conveniently as a slurry) into the bottom portion of the contacting apparatus and feeding pulsating liquid into the top portion of said contacting apparatus provided with a series of contacting compartments formed by a train of perforated horizontal or gently sloping plates each having one or more upflow ducts, to connect the adjacent contacting compartments together, which extend downwardly into a contacting compartment to provide a weir which controls the level of the solids in that contacting compartment and which extend up beyond the minimum level of the solids in the next upper contacting compartment and the position of which is remote in relation to the ducts in adjacent plates, passing a feed liquid down through the perforated plates so that it passes down through each contacting compartment in turn, pulsating said feed liquid so that the bed of particles lying beneath each perforated plate is completely or partly fluidized on the downward pulsation and is completely or partly floated on the upward pulsation and so that the movement of the particles at each pulsation is thereby restricted to a limited extent dependent on the magnitude of the pulsation, adjusting the magnitude of the pulsation to control the mobility of the particles and adjusting the overall liquid flow velocity to give the desired liquid contact time in the contacting apparatus, permitting the particles to flow consecutively from contacting compartment to contacting compartment at a rate equal to the rate at which the particles are fed to the apparatus, this rate being less than the maximum rate at which particles can flow freely under the weir in each contacting compartment, withdrawing the particles by suitable means from one or more contacting compartments, and removing the liquid which has passed down the contacting apparatus countercurrently to the ascending solids.

Still another feature of this invention resides in obtaining continuous countercurrent contact between solid adsorbent particles and liquid by feeding a particulate solid adsorbent, in the case where the particles have a density greater than that of the liquid to be contacted, into a hopper compartment extending through a perforated cover plate covering the top of a contacting apparatus and communicating with a top contacting compartment of the contacting apparatus, the contacting apparatus being provided with a series of contacting compartments formed by a train of perforated horizontal or gently sloping plates each having one or more openings which connect the adjacent contacting compartments together and the position of which is remote in relation to the ducts in adjacent plates, passing a feed liquid up through the perforated plates so that it passes up through each contacting compartment in turn, pulsating said feed liquid so that the bed of particles lying on each perforated plate is completely or partly fluidized on the upward pulsation and is completely or partly settled on the downward pulsation and so that the movement of the particles at each pulsation is thereby restricted to a limited extent dependent on the magnitude of the pulsation, adjusting the magnitude of the pulsation to control the mobility of the particles and adjusting the overall liquid flow velocity to give the desired liquid contact time in the contacting apparatus, permitting the particles to flow consecutively from contacting compartment to contacting compartment at a controlled rate determined by the rate of withdrawal of the particles from one or more of said compartments, and removing the liquid which has passed up the contacting apparatus countercurrently to the descending solids. In the case of this feature also, the size of the perforations in the plates must be less than the size of the particles, the percentage of void area in the plates should be as high as possible and the pulsation should be distributed evenly over the cross-section of the contacting apparatus. In the case where the particles have a density less than that of the liquid the procedure is reversed by feeding the particulate solid (most conveniently as a slurry) into a hopper compartment which is closed at the bottom and which extends through a perforated cover plate covering a bottom contacting compartment and which communicates with said compartment, the contacting apparatus being provided with a series of contacting compartments formed by a train of perforated horizontal or gently sloping plates each having one or more openings which connect the adjacent contacting compartments together and the position of which is remote in relation to the openings in adjacent plates, feeding the liquid to be contacted into the upper portion of the contacting apparatus and passing it down through the perforated plates so that it passes down through each contacting compartment in turn, pulsating said feed liquid so that the bed of particles lying under each perforated plate is completely or partly fluidized on the downward pulsation and is completely or partly floated on the upward pulsation and so that the movement of the particles at each pulsation is thereby restricted to a limited extent dependent on the magnitude of the pulsation, adjusting the magnitude of the pulsation to control the mobility of the particles and adjusting the overall liquid flow velocity to give the desired liquid contact time in the contacting apparatus, permitting the particles to flow consecutively from contacting compartment to contacting compartment at a controlled rate determined by the rate of withdrawal of the particles from one or more contacting compartments, and removing the liquid from a withdrawal compartment, which closes the bottom of the contacting apparatus, after the liquid has passed down the contacting apparatus countercurrently to the descending solids, the size of the perforations in the plates being less than the size of the particles.

Various forms of apparatus embodying the present invention for carrying out the continuous countercurrent contacting of solid adsorbent particles with liquid are illustrated in the accompanying drawings, in which—

Figure 5 is a schematic diagram of a further form of contacting apparatus, and

Figure 6 is a schematic diagram of a still further form of contacting apparatus.

Figure 1:
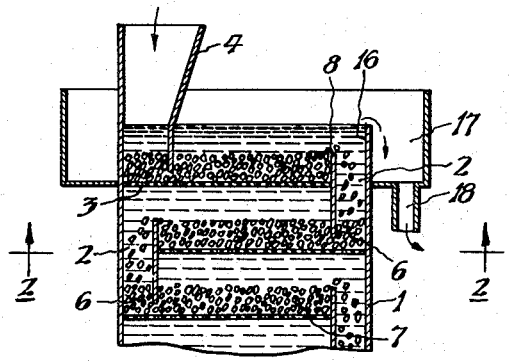
Figure 1 is a schematic diagram of one form of contacting apparatus.
Figure 1:
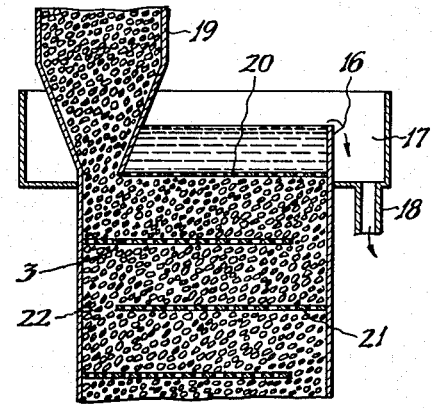
Figure 1:
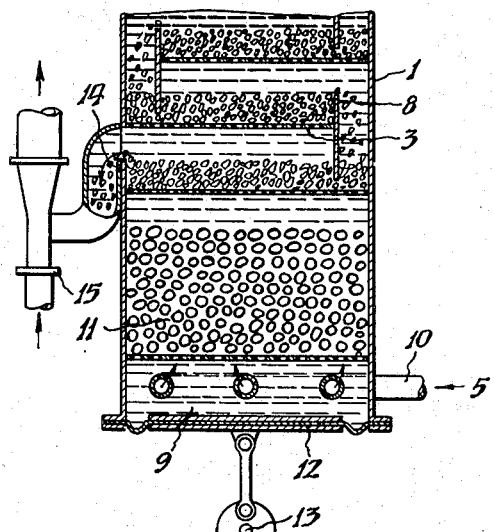
Figure 2:
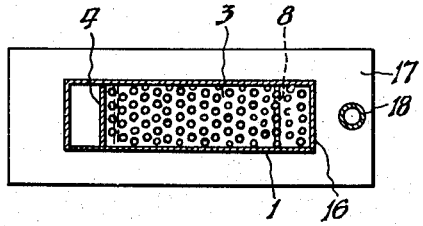
Figure 2 is a cross-sectional plan view of Figure 1 drawn along the line 2—2 of Figure 1.

One form of the apparatus shown in Figures 1 and 2 is preferably constructed in the form of a tower 1 having the duct or ducts 2 of each compartment (bounded by perforated plates 3) staggered in relation to those of adjacent compartments, but it would be possible, although normally less convenient, to arrange the compartments in cascade formation, in which case the duct or ducts of each compartment would be positioned laterally away from the ducts of adjacent compartments. The perforated plates 3 are relatively horizontal; in other words, they may be horizontal or gently sloping. They are preferably composed of one or more layers of wire gauze, the holes or mesh size being less than that of the solid particles to be handled. The particulate solid adsorbent (if heavier than the liquid) is continuously fed on to the top plate of the apparatus through a hopper 4 and meets a rising pulsating stream of the liquid 5 to be contacted with the solid. The pulsations and flow velocity of the liquid are adjusted so that during the upward pulsation the net liquid flow velocity is sufficient to lift the particles resting on the perforated plate and thereby fluidize them. During the descending pulsation the net liquid flow velocity is less than that of the free settling velocity of the particles so that the particles commence to sink. Thus even if there is no net feed of liquid to the apparatus fluidization can occur during every upward pulsation if the velocity of pulsation is sufficiently high. This is in contrast to the operation of continuously fluidized particle systems which require the maintenance of a continuous liquid flow velocity. Hence the residence time of the liquid in this apparatus may be controlled independently of the conditions required for fluidization. Since each pulsation is of short duration, a solid particle when in the fluidized state can only migrate a limited distance. Hence short-circuiting and back-mixing are considerably less than that in continuously fluidized systems, where continuous particle movement occurs. Further, the temporary fluidization results in uniform liquid and solid distribution over each plate.

The flow of solids over each perforated plate may be distributed in a variety of ways by means of suitably placed baffles (not shown on the accompanying drawings). Thus a series of longitudinal vertical baffles extending between each perforated plate and the one immediately above it and provided with openings at opposite and alternate ends will allow the particles to traverse the plate a number of times before reaching the duct or ducts leading to the next lower compartment. Any tendency of the particles to flow in one plane across the plate without adequately mixing with the majority of the solid particles on the plate may be minimized by providing a series of transverse baffles extending between the walls of the tower and/or between the longitudinal baffles (if provided) and having openings alternating between the top and the bottom of the compartment so that the particles must move alternately to the top and bottom of the compartment to pass out.

The lower ends of the ducts 2, through which particles descend from plate to plate, extend into the bed of solids 7, even at the end of the downward pulsation, and form a seal which prevents liquid above the bed of solids from flowing directly across the upper portion of the compartment and up through the duct. The resistance to liquid flow through the bed of solids beneath the duct and up through the duct is less than up through the two adjacent beds of solids, so that the liquid velocity up through the duct exceeds that up through the two superimposed beds of solids. The greater liquid flow rate up through the duct, provided it is not of too great a magnitude, is advantageous as it assists the passage of solids over the weirs 8 formed by the upward extension of the ducts. These weirs ensure that the outflow of solids occurs from the upper portion of each compartment. The fluidized solids in each compartment behave as a fluid since the amount of solid which discharges over a weir 8 equals the rate at which solids are added to the compartment provided that the solids are not added at such a rate that they build up in a compartment and completely fill and jam it. It is essential, if the above conditions are to follow, that the solids feed rate be adjusted to ensure that there is adequate space between the maximum solids level and the base of the next compartment. The solids may be removed, after discharging over the final weir, by any suitable device such as an ejector 15.

The pulsation is imparted to the feed liquid as it enters a chamber 9 via a distributor pipe 10 beneath the bottom perforated plate. This chamber is provided with a suitable flow distributing device 11, such as a system of baffles or a bed of Raschig rings or other packing of suitable depth, to distribute the pulsations evenly throughout the whole cross-sectional area of the contacting apparatus.

The pulsations may be imparted to the feed liquid by any of a number of well known devices. For example the liquid may enter a chamber provided with a diaphragm 12 reciprocated by the eccentric 13.

The liquid after passing up through the apparatus may leave over the weir 16 formed by the upper edge of the tower 1 via the launder 17 and discharge pipe 18.

Since the particles are in a less turbulent state than those in a continuously fluidized system attrition will be less. This is of particular importance if adsorbents or catalysts are contacted in the apparatus and have to be reused a large number of times.

Figure 3:
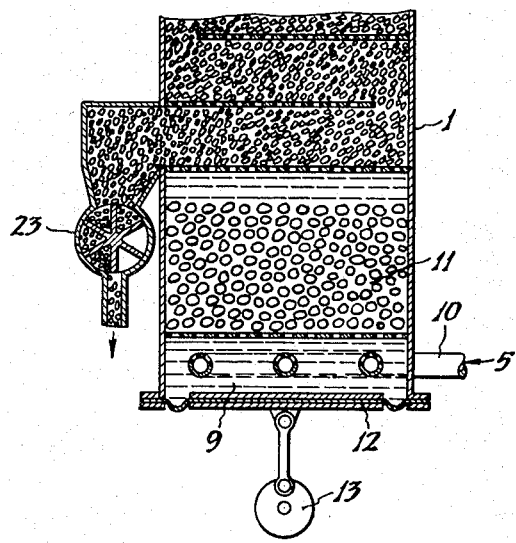
Figure 3 is a schematic diagram of another form of contacting apparatus.
Figure 4:
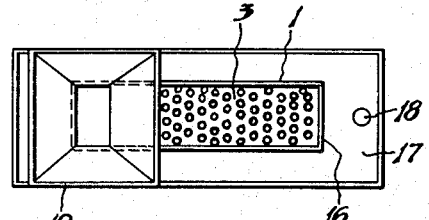
Figure 4 is a plan view of Figure 3.

If it is desired to operate the apparatus in such a manner that the rate at which solids pass through the contacting apparatus from a storage hopper is determined by the rate at which solids are withdrawn from the apparatus the modification of the apparatus of Figures 1 and 2 shown in Figures 3 and 4 may be employed. The storage hopper 19 communicating with the upper compartment of the contacting apparatus is sealed on to a perforated cover plate 20 fitted at the top of the contacting tower 1. This tower is provided with a series of perforated plates 31 having staggered openings 22. Solids may leave the final compartment through any suitable rate controlling device such as the star valve 23. In all other respects the apparatus resembles that shown in Figures 1 and 2. The solid is caused to fill completely each compartment during the upward pulsation thus forming a fluidized mass throughout the whole apparatus. Under these conditions the speed of rotation of the star valve will govern the rate at which the solids flow from the storage hopper through the contacting apparatus.

Figures 5 and 6 show two forms of apparatus, which may be used in the case where the particles have a density less than that of the liquid to be contacted. In the apparatus shown in Figure 5 the particulate solid is fed as a slurry through a pipe 24 into the bottom portion of the contacting apparatus 1 and feed liquid 5 is fed into the top portion of said contacting apparatus, which is provided with a series of contacting compartments formed by a train of perforated horizontal or gently sloping plates 3 each having one or more upflow ducts 2, to connect the adjacent contacting compartments together, which extend downwardly into a contacting compartment to provide a weir 8 which controls the level of the solids 7 in that contacting compartment and which extend up beyond the minimum level of the solids in the next upper contacting compartment and the position of which is remote in relation to the ducts in adjacent plates. A feed liquid 5 is passed down through the perforated plates so that it passes down through each contacting compartment in turn. The feed liquid is pulsated by means of a diaphragm 12 operated by an eccentric 13 so that the bed of particles lying beneath each perforated plate is completely or partly fluidized on the downward pulsation and is completely or partly floated on the upward pulsation and so that the movement of the particles at each pulsation is thereby restricted to a limited extent dependent on the magnitude of the pulsation, which is adjusted to control the mobility of the particles. The overall liquid flow velocity is adjusted to give the desired liquid contact time in the contacting apparatus, and the particles are permitted to flow consecutively from contacting compartment to contacting compartment at a rate equal to the rate at which the particles are fed to the apparatus, this rate being less than the maximum rate at which particles can flow freely under the weir in each contacting compartment. The particles are withdrawn under the weir 14 by an injector 15 or other means, and the liquid which has passed down the contacting apparatus countercurrently to the ascending solids is withdrawn through the pipe 25.

In the apparatus shown in Figure 6 the particulate solid is fed as a slurry through the pipe 24 into a hopper compartment 26 which is closed at the bottom and which extends through a perforated cover plate 27 covering the bottom contacting compartment and which communicates with said compartment. The contacting apparatus is provided with a series of contacting compartments formed by a train of perforated horizontal or gently sloping plates 31 each having one or more openings 22 which connect the adjacent contacting compartments together and the position of which is remote in relation to the openings in adjacent plates. The liquid 5 to be contacted is fed through a pipe 10 into the upper portion of the contacting apparatus and passes down through the perforated plates so that it passes down through each contacting compartment in turn. The feed liquid is pulsated by means of the diaphragm 12 operated by the eccentric 13 so that the bed of particles lying under each perforated plate is completely or partly fluidized on the downward pulsation and is completely or partly floated on the upward pulsation and so that the movement of the particles at each pulsation is thereby restricted to a limited extent dependent on the magnitude of the pulsation. The magnitude of the pulsation is adjusted to control the mobility of the particles, and the overall liquid flow velocity is adjusted to give the desired liquid contact time in the contacting apparatus. The particles flow consecutively from contacting compartment to contacting compartment at a controlled rate determined by the rate of withdrawal of the particles through the star valve 28 or other withdrawal device. The liquid is withdrawn through the pipe 29 from a withdrawal compartment 30, which closes the bottom of the contacting apparatus. As previously mentioned, the size of the perforations in the plates must be less than the size of the particles.

The apparatus is adaptable to the use of particles having a wide range of size. It is desirable, however, that the particles be no finer than about 200 mesh and preferably be fairly coarse as, for example, 20-60 mesh. It is preferrred that a reasonably well classified material be employed.

A tower for the continuous countercurrent contacting of solids and liquids has been proposed, for example, in United States Letters Patent No. 2,632,720, issued March 24, 1953, to S. F. Perry, which includes a series of compartments formed between perforated plates provided with staggered ducts which connect adjacent compartments, but the feed liquid flows continuously upwards without pulsation, so that the liquid contact time must necessarily be relatively short because the liquid velocity must be high enough to fluidize the bed of particles.

In the claims the expression "relatively horizontal" is intended to mean horizontal or gently sloping.

We claim:

1. A method of obtaining continuous countercurrent contact between solid adsorbent particles and liquid which comprises feeding a particulate solid absorbent to one end portion of a contacting apparatus and feeding liquid countercurrently to said solid from the opposite end portion of such contacting apparatus, passing said solid along a series of perforated plates arranged at progressively varying levels and pulsating said liquid so that at each pulsation liquid passes through and returns through the perforations in said plates and thus produces non-turbulent partially fluidized beds of solid particles in contacting compartments adjacent to said plates, adjusting the magnitude of the pulsations to control the mobility of the particles and adjusting the overall liquid flow velocity to give the desired liquid contact time in the contacting apparatus, permitting the particles to flow consecutively from contacting compartment to contacting compartment at a controlled rate, removing the particles from the apparatus after countercurrent contact with the liquid, and removing the liquid which has passed countercurrently to the solids through the contacting apparatus.

2. The combination in apparatus for obtaining continuous countercurrent contact between solid adsorbent particles and liquid, of a train of relatively horizontal perforated plates positioned at progressively varying levels, compartments formed adjacent to said plates, passages connecting said compartments to adjacent compartments, means for feeding a liquid to one end portion of said apparatus, means for feeding particulate solid adsorbent to the other end portion of said apparatus, means for pulsating said liquid and for distributing such pulsation, means for withdrawing slurry from a portion of the apparatus remote from that to which the solid is fed, and means for withdrawing liquid from a portion of the apparatus remote from that to which the liquid is fed, the inlet and outlet passages of each compartment being remote from one another.

3. Apparatus for obtaining continuous countercurrent contact between solid adsorbent particles and liquid; said apparatus comprising a housing having a plurality of generally horizontal superposed perforated plates therein, means for introducing solid adsorbent particles to said housing at one side of the first of said plates, and adjacent one end of the latter, means for removing solid adsorbent particles from the housing at a location remote from said particle introducing means so that the solid adsorbent particles move along said plates toward said particle removing means, means supplying liquid to said housing at a location remote from said particle introducing means, means withdrawing liquid from said housing at a location spaced from said liquid supplying means in the direction toward said particle introducing means and at a rate sufficient to continuously immerse said plates and adsorbent particles in the liquid so that the liquid flows countercurrently to the movement of the adsorbent particles, and means pulsating the liquid in the direction substantially normal to said plates, so that the solid adsorbent particles are semi-fluidized thereon.

4. Apparatus for obtaining continuous countercurrent contact between solid particles and liquid; said apparatus comprising a fixed housing having a plurality of superposed perforated plates extending generally horizontally therein, means passing solid particles through said housing along said plates at one side of the latter, means supplying liquid to said housing to a depth continuously immersing said plates and the solid particles, means producing flow of the liquid through the housing in the direction countercurrent to the movement of the particles, a wall of said housing substantially parallel to said plates being movable relative to the remainder of the housing, and means reciprocating said wall in the direction normal to said plates so that the liquid is pulsated in said direction and the particles are thereby semi-fluidized on the plates.

References Cited in the file of this patent

UNITED STATES PATENTS

| 804,841 | Hedburg | Nov. 21, 1905 |
| 1,162,112 | Standefer | Nov. 30, 1915 |
| 1,708,057 | Gehring | Apr. 9, 1929 |
| 1,944,607 | Millan | Jan. 23, 1934 |
| 2,222,777 | Linke | Nov. 26, 1940 |
| 2,632,720 | Perry | Mar. 24, 1953 |

FOREIGN PATENTS

| 554,192 | Great Britain | June 24, 1943 |